Feb. 14, 1961 R. E. BRUMBACH 2,971,538
EXTRUDED TUBING
Filed Jan. 31, 1958

INVENTOR.
ROBERT E. BRUMBACH
BY
Bates, Teare & McBean
ATTORNEYS

United States Patent Office 2,971,538
Patented Feb. 14, 1961

2,971,538
EXTRUDED TUBING
Robert E. Brumbach, Mantua, Ohio, assignor to Samuel Moore & Co., Mantua, Ohio, a corporation of Ohio
Filed Jan. 31, 1958, Ser. No. 712,473
2 Claims. (Cl. 138—49)

This invention relates in general to extruded tubing and the like, and more particularly to the provision of a novel composite tubular structure, and including a protective sheath or outer skin for such tubing.

Extruded tubing is useful in many industrial applications, such as for carrying or transmitting energy, including gases, fluids, electricity etc. from one place to another, and in particular has found wide usage as instrument tubing. Tubing bundle assemblies comprising a plurality of tubular carriers or conduits disposed in juxtaposed, parallel relationship with an outer protective sheath or envelope of plastic material extruded thereover to follow the external contour of the tubing bundle and restrict relative movement between the individual tubular conduits or members have been produced and have been found to have great useability, particularly in instrument tubing applications. The individual tubular members or conduits for such bundle assemblies have been extruded from various thermoplastic materials or polymers, such as for instance polyethylene, with the outer sheath or envelope being comprised of another thermoplastic, resinous substance, such as an elastomeric vinyl compound, for instance polyvinyl chloride, the latter materials being well known in the art.

It has been found, however, that sometimes the individual polyethylene tubes of the above mentioned tubing bundle have failed in service, caused primarily, it is believed, by exudation of vinyl plasticizers from the vinyl envelope onto the confronting surfaces of the polyethylene tubes. The plasticizers then, under certain conditions, cause a breakdown of the polyethylene molecules, and resulting in cracking and ultimate failure of the polyethylene tubing.

The present invention provides a composite, extrudable tubular structure which can be readily and economically manufactured, and can be facilely produced in the form of a bundle assembly arrangement, and which does not possess any of the above mentioned undesirable characteristics of the prior art arrangements. The composite tubular structure includes an external protective sheath, skin or casing of extrudable material which will not react chemically with the plastic envelope enclosing a plurality of the individual tubular elements into a bundle assembly, and which will provide an improved, composite tubular structure possessing many desirable characteristics as compared to known arrangements. More particularly, in one form of the invention, the composite tubular structure is formed of an inner layer of synthetic thermoplastic, resinous material, such as the above discussed polyethylene, with an outer sheath, casing, or layer of nylon extruded thereover and bonded thereto. Such a composite structural arrangement of tubular element may be readily formed into a bundle assembly by providing a plurality of such tubular elements in juxtaposed relationship and extruding an envelope of a synthetic, thermoplastic, resinous substance, such as the aforementioned elastomeric vinyl material, therearound. In another form of the invention, the composite tubular element is comprised of an inner layer or body of nylon, with an outer coating, skin or sheath of vinyl material extruded therearound.

Accordingly, an object of the invention is to provide an improved, flexible, composite tubular structure comprised of two layers of extrudable plastic material and in which one of the layers is formed of nylon.

Another object of the invention is to provide an improved composite tubular structure comprising an inner layer or body of polyethylene and an outer layer or covering of nylon completely encasing the outer periphery of the inner layer and in juxtaposed, bonded relationship therewith to form a composite conduit, and wherein the wall thickness of the outer layer is much thinner as compared to the wall thickness of the inner layer of material.

Another object of the invention is to provide a tubing bundle assembly comprised of a plurality of individual tubular elements of the above mentioned composite structure type and wherein the plurality of tubular elements are covered with a unitary, outer envelope of an extrudable substance, and in particular an envelope composed of an elastomeric vinyl material.

A further object of the invention is to provide an improved composite tubular structure comprising an inner layer or body of nylon and an outer sheath or layer of vinyl material encasing the inner layer and in juxtaposed, bonded relationship therewith, with the inner layer being of substantial wall thickness as compared to the outer layer.

Other features and advantages of the invention will be apparent from the following description taken in conjunction with the accompanying drawings wherein.

Figure 1:
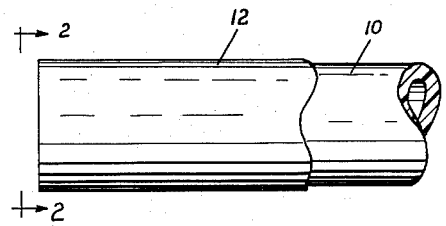
Fig. 1 illustrates a composite tubular structure in accordance with the invention and having an external sheath or layer of nylon, the latter being cut away to show the inner layer or body of polyethylene material.
Figure 2:
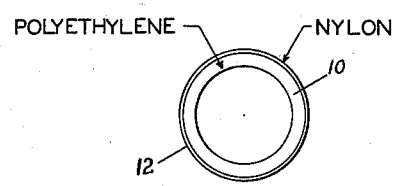
Fig. 2 is a vertical, end view taken substantially along line 2—2 of Fig. 1 looking in the direction of the arrows.

Referring now to Figs. 1 and 2, there is shown a composite tubular structure for use as a conduit to transmit energy in fluid or electrical form from one place to another, as for instance for instrument tubing. The composite tubular structure in the embodiment shown comprises a flexible inner body or layer 10 of polyethylene which forms the major strengthening portion of the tubing and an outer layer or skin 12 of nylon extruded therearound and bonded thereto. The extrusion of the nylon sheath may be performed simultaneously with the extrusion of the polyethylene tubing in a manner known to those skilled in the art, thereby involving no additional separate procedural steps and therefore no additional manpower. An effective, composite tubular member of the latter described type has been produced with an over-all wall thickness of the composite tubular structure being of the order of .040 of an inch with the nylon sheath or skin being approximately 2 to 3 mils in thickness. The presence of the nylon sheath 12 increases the resistance of the polyethylene tubing to petroleum hydrocarbons, which, to some degree, have a damaging effect on polyethylene. In addition, since nylon is much more abrasion resistant as compared to polyethylene, the tubular element so encased in nylon will be much more resistant to damage in the environmental settings in which such instrument tubing is generally used. The nylon skin may be extruded over the outer periphery of the inner body of polyethylene either without or with an adhesive to aid in bonding the nylon layer to the inner polyethylene layer. If such an adhesive is used, many such adhesives being known to those skilled in the art, the bond between the outer layer of nylon and inner body of polyethylene will be improved over that existing if the nylon is merely extruded onto the polyethylene without the presence of an adhesive.

Figure 3:
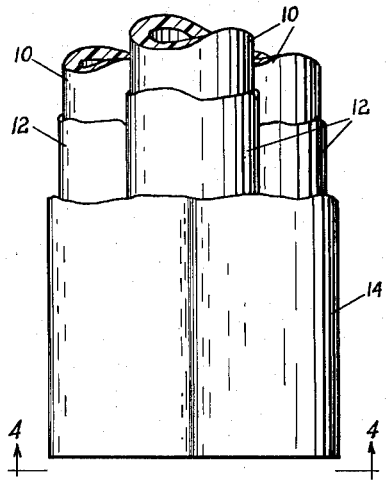
Fig. 3 illustrates a portion of a tubing bundle assembly formed from the composite tubular elements of Fig. 1 in accordance with the invention, and including an outer envelope of vinyl material to restrict relative movement between the individual tubular elements and with the outer envelope of vinyl and the sheaths of nylon encircling each of the individual polyethylene tubes, being cut away.
Figure 4:
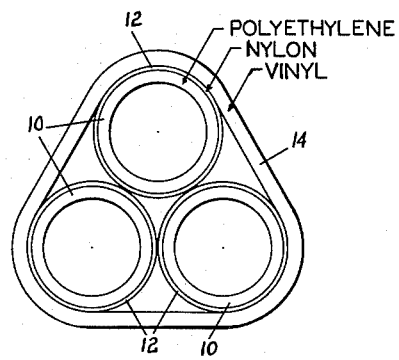
Fig. 4 is a vertical end view taken substantially along line 4—4 of Fig. 3 looking in the direction of the arrows.

In Figs. 3 and 4 there is shown a bundle assembly of a plurality of the composite tubular elements illustrated in Figs. 1 and 2. The bundle assembly comprises a plurality of the nylon sheathed, polyethylene tubes heretofore described, encased in an outer envelope 14 of a vinyl elastomeric compound, such as polyvinyl-chloride.

The extrusion of the vinyl envelope 14 over the juxtaposed nylon sheathed, polyethylene tubes may be accomplished in a continuous process thereby conveniently lending itself to and providing for mass production procedures. The skin of nylon on each of the composite tubular elements will provide an impermeable barrier, and will also prevent the polyethylene portions 10 of the tubes from sticking or heat bonding to one another in service.

The outer layer or skin 12 of nylon is also highly beneficial in the following instance: If the outer envelope 14 of the bundle assembly were extruded from the same material as the inner layer of the tubular elements (i.e. if envelope 14 was of polyethylene), then during the extrusion of the outer envelope 14 about the tubular elements, the latter would become heat bonded to the enclosing envelope 14 if it were not for the skins 12 of nylon protecting the outer periphery of each of the tubular elements. Thus, it will be seen that a bundle assembly may be effectively formed with the outer envelope 14 of the bundle being comprised of the same material as the primary material used to form the body portions of the tubular elements without the undesirable characteristic of heat bonding or sticking between the outer envelope of the bundle and the tubular elements, because the impermeable outer skin or sheath of extrudable material forming the outer periphery of each of the tubular elements prevents the latter undesirable result from occurring.

Since nylon is much more abrasion resistant as compared to polyethylene, the composite tubular elements will be much more resistant to damage as for instance which might tend to occur when the ends of the outer envelope 14 of the bundle assembly are cut back in order that the tubular elements may receive fittings for attachment to instrumentation. Furthermore, in case of the failure of the separating film or skin 12 on a tubular element, only one of the polyethylene tubes and not the whole pack would be impaired, thereby resulting in obvious economic and operating advantages.

Figure 5:
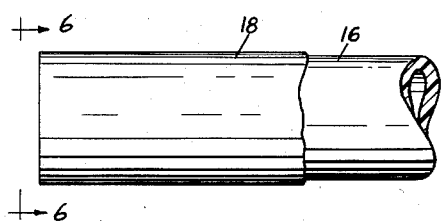
Fig. 5 illustrates a portion of a further form of composite tubular element comprised of inner layer or body of nylon material and an outer layer or protective coating of vinyl material, with the outer sheath of vinyl being cut away.
Figure 6:
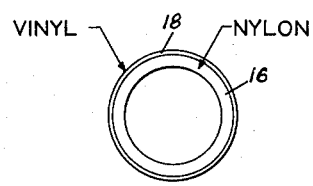
Fig. 6 is a vertical end view taken substantially along line 6—6 of Fig. 5 looking in the direction of the arrows.

In Figs. 5 and 6 there is shown a further embodiment of composite tubular structure in accordance with the invention, wherein the inner body or layer 16 of the tubular element is comprised of nylon and the outer sheath or skin 18 is a vinyl material, such as polyvinyl-chloride. In this embodiment, the body or layer of nylon forms the main strengthening portion of the tubing structure. Such a tubular structure is particularly adapted for out door use, since the vinyl sheath provides considerable resistance to ultraviolet light, nylon by itself having very little resistance to such light. Also, since nylon is not too resistant to notch sensitivity, the vinyl sheath provides a greater notch strength because the latter is quite resistant to notch sensitivity. A property of nylon which could cause difficulty in instrument tubing is its ability to absorb moisture. The vinyl sheath 18 tends to maintain a stabilized moisture content in the nylon so that the physical properties of the body portion of the composite tube will remain nearly the same under all conditions. The vinyl skin may be extruded over the outer periphery of the inner body of nylon either without or with an adhesive to aid in bonding the vinyl layer to the inner nylon layer.

From the foregoing description and accompanying drawings it will be seen that the invention provides a novel, composite structure for a tubular element for use as conduit and the like, and wherein the tubular element comprises a protective outer layer or skin of extrudable material bonded to an inner layer of extruded material, and wherein at least one of the layers is comprised of nylon. This invention also provides a composite tubular element which can be readily formed into a bundle assembly, and which will provide the latter with improved service life and strength characteristics, as compared to tubing bundle assemblies heretofore known. In addition the invention provides a composite tubular structure which has increased resistance to ultraviolet light, to notch sensitivity, and to moisture absorbency.

The terms and expressions which have been used are terms of description and not of limitation and there is no intention in the use of such terms and expressions of excluding any equivalents of the features shown and described or portions thereof, but it is recognized that various modifications are possible within the scope of the invention claimed.

I claim:

1. A plural duct assembly for use as instrument tubing and the like comprising, a plurality of unconnected elongated flexible tubular elements of composite structure disposed in juxtaposed relation to each other, each of said tubular elements comprising a continuous inner layer of extruded polyethylene material and a continuous outer layer of extruded nylon material encircling said inner layer for the full axial length thereof and being bonded thereto, said outer layer providing a protective and impermeable sheath for said inner layer, and an extruded vinyl plastic envelope, such as polyvinyl chloride, surrounding and firmly binding the bundle of tubular elements together, said outer layer of each of the tubular elements preventing any reaction between said envelope and said inner layer and preventing adhesion between the inner layers of the adjacent tubular elements, said vinyl envelope protecting said outer layers of said tubular elements against the deleterious effects of weathering and providing for the ready exposure of the ends of said tubular elements for assembly of the same with individual hose fittings.

2. A plural duct assembly in accordance with claim 1 wherein said inner layer of each of said tubular elements is of substantial wall thickness as compared to the film thickness of the outer layer, thereby facilitating the assembly of said tubular elements with hose fittings upon peeling back of said envelope from an end of said assembly.

References Cited in the file of this patent

UNITED STATES PATENTS

| 2,053,112 | Schnabel | Sept. 1, 1936 |
| 2,436,421 | Cork | Feb. 24, 1948 |
| 2,525,272 | Rhoton | Oct. 10, 1950 |
| 2,528,235 | Loritsch | Oct. 31, 1950 |
| 2,598,090 | Yung et al. | May 27, 1952 |
| 2,624,366 | Pugh | Jan. 6, 1953 |
| 2,645,249 | Davis | July 14, 1953 |
| 2,690,769 | Brown | Oct. 5, 1954 |
| 2,749,943 | Nemeth | June 12, 1956 |
| 2,770,566 | Ritter | Nov. 13, 1956 |
| 2,781,551 | Richerod | Feb. 19, 1957 |